United States Patent [19]

Swan

[11] Patent Number: 4,845,871
[45] Date of Patent: Jul. 11, 1989

[54] ATTACHMENT DEVICE

[76] Inventor: Richard E. Swan, 171 West St., East Bridgewater, Mass. 02333

[21] Appl. No.: 183,082

[22] Filed: Apr. 19, 1988

[51] Int. Cl.[4] ............................................. F41G 1/38
[52] U.S. Cl. .................................. 42/101; 33/250; 403/374
[58] Field of Search ............... 42/101; 244/3.25; 33/250; 403/374, 409.1

[56] References Cited

U.S. PATENT DOCUMENTS

| | | | |
|---|---|---|---|
| 3,276,377 | 10/1966 | Bell | 244/3.24 |
| 3,611,606 | 10/1971 | Sefried et al. | 42/101 |
| 4,027,414 | 6/1977 | Felix | 42/101 |
| 4,085,511 | 4/1978 | Kovac | 33/250 |
| 4,205,473 | 6/1980 | Wilson | 42/101 |
| 4,249,315 | 2/1981 | Hopson, III | 33/250 |
| 4,722,496 | 2/1988 | Herrmann et al. | 244/3.25 |

Primary Examiner—Deborah L. Kyle
Assistant Examiner—Michael J. Carone

[57] ABSTRACT

The invention disclosed herein comprises a means of attaching a first device to a second device. The attachment means includes a camming surface and is spring loaded. The attachment means is particularly useful in attaching a first weaver interface to a second weaver interface. The camming surfaces and spring loading permitting adjustments to permit proper attachment to varying interface surfaces.

7 Claims, 2 Drawing Sheets

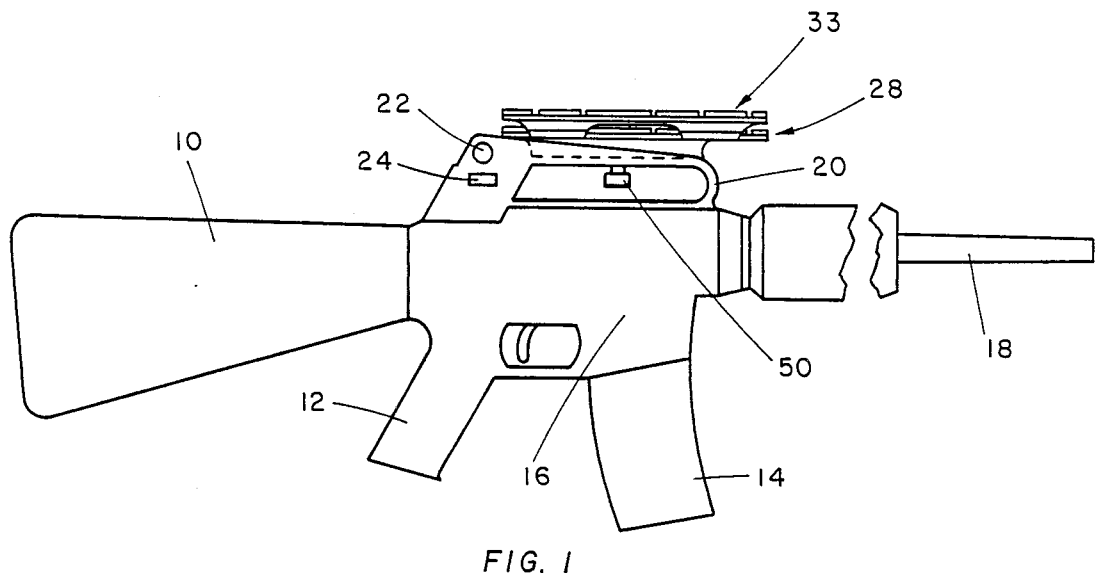
FIG. 1
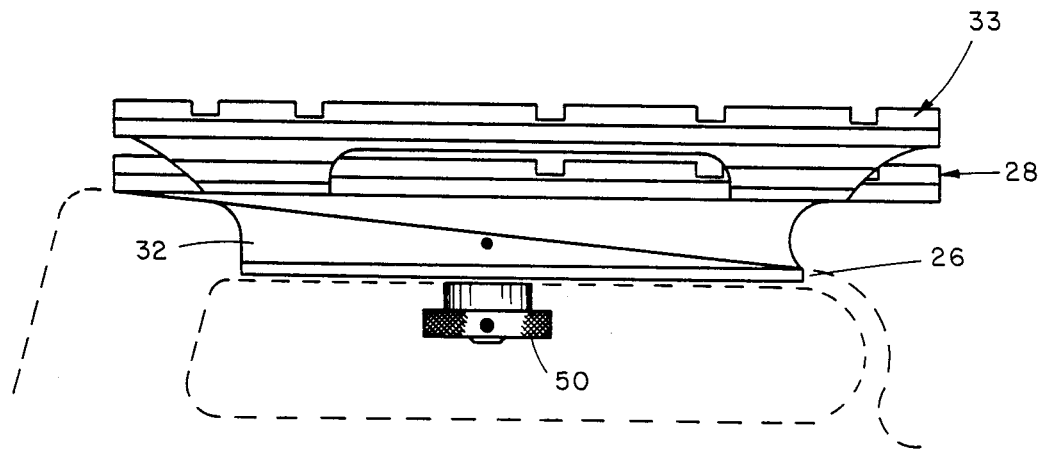
FIG. 2
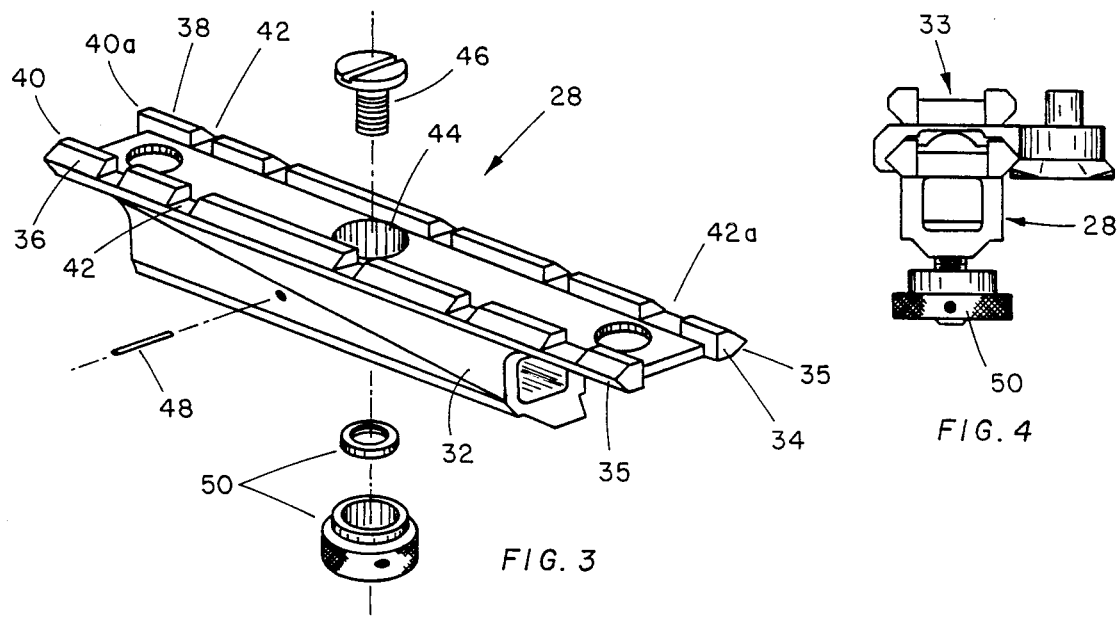
FIG. 3
FIG. 4

ATTACHMENT DEVICE

BACKGROUND OF THE INVENTION

Field of the Invention

This invention relates to attachment means and more specifically to a means of attaching device to a weaver railing.

BRIEF DESCRIPTION OF THE DRAWINGS

Further details are explained below with the help of the example(s) illustrated in the attached drawings in which:

FIG. 1 is a side elevational view of a firearm with a first and second weaver rail, the first weaver rail attached to the firearm using a lock nut and the first and second weaver rails connected together using the attachment means according to the present invention;

FIG. 2 is an enlarged side elevational view of the first and second weaver rails and a portion of the firearm shown in FIG. 1;

FIG. 3 is an enlarged, exploded perspective view of the first weaver rail shown in FIG. 1;

SUMMARY OF THE INVENTION

Figure 4:
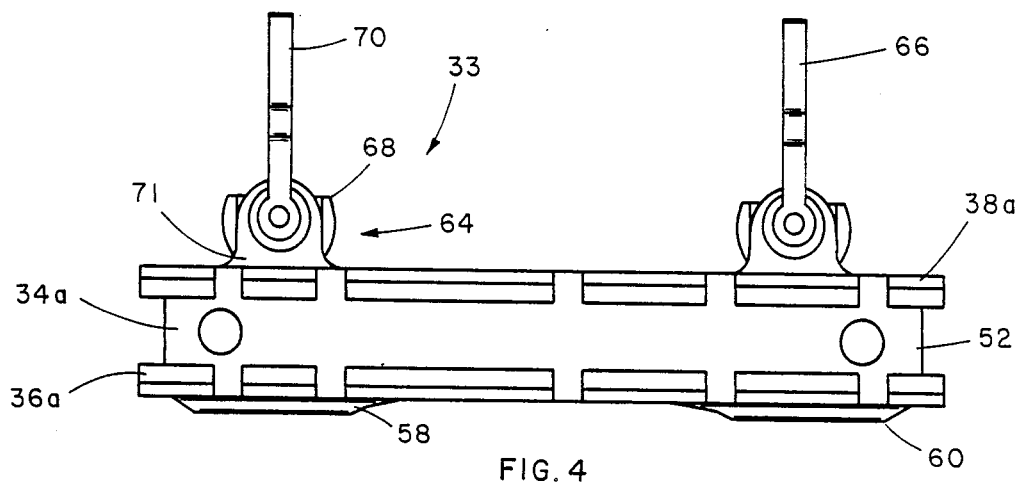
FIG. 4 is a top plan view of the second weaver rail shown in FIG. 1 according to the present invention.
Figure 5:
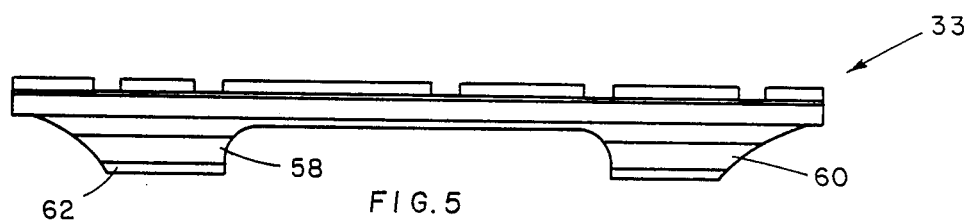
FIG. 5 is a side elevational view of the second weaver rail shown in FIG. 4.
Figure 6:
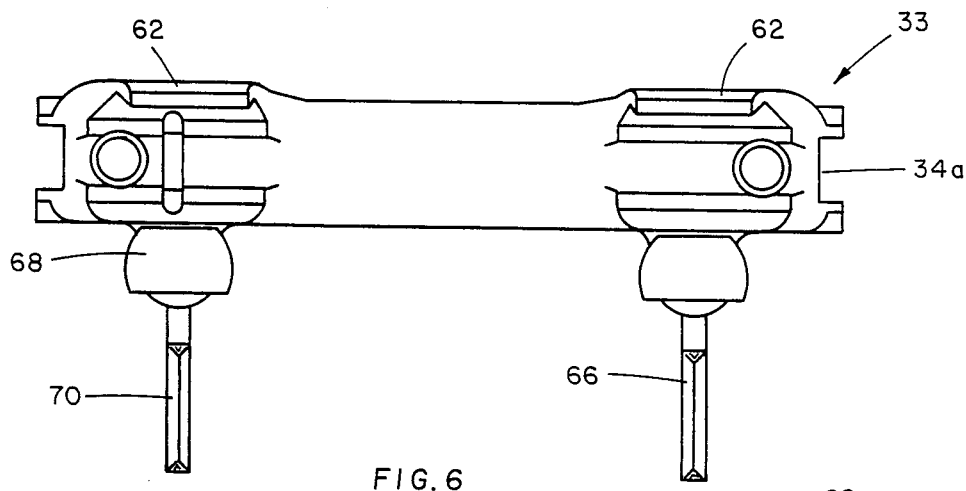
FIG. 6 is a bottom plan view of the second weaver rail shown in FIG. 4.
Figure 7:
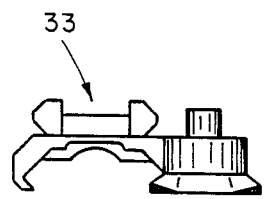
FIG. 7 is a front elevational view of the first fastener device attached to the second weaver rail shown in FIG. 4 without the first actuating means attached thereto.
Figure 8:
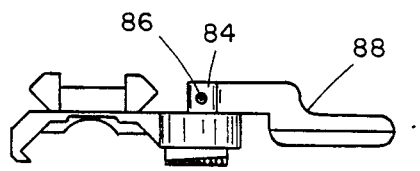
FIG. 8 is a front elevational view of the first fastener device attached to the second weaver rail shown in FIG. 4 with the first actuating means attached thereto.
Figure 9:
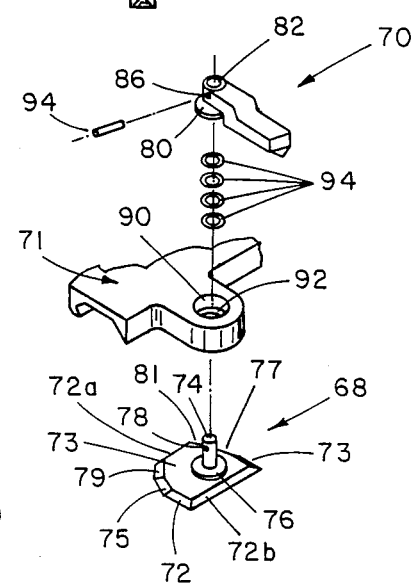
FIG. 9 is an enlarged, exploded perspective view of the first fastener device attached to the second weaver rail shown in FIG. 4 broken away.

The invention disclosed herein comprises a means of attaching a first device to a second device. The attachment means including a camming surface and being spring loaded. The attachment means is particularly useful in attaching a first weaver interface to a second weaver interface. The camming surfaces and spring loading permitting adjustments to permit proper attachment to varying interface surfaces.

DESCRIPTION OF THE PREFERRED EMBODIMENT(S)

There is shown in the drawings at FIG. 1 an outline of an automatic firearm 9 of the M16 rifle family with a conventional stock 10, pistol grip 12, magazine 14, chamber 16 and barrel 18. An arced handle 20 is positioned above the chamber 16 and has the after part of a non-optical bead sight with windage and elevational adjustment devices 22, 24 located at the rear thereof remote from the barrel 18. The upper, horizontal run 26 of the handle 20 provides a recess for receiving a first weaver interface or first weaver platform 28. The run 26 includes a through hole for a purpose to be described hereinafter. A telescopic sight, not shown, is removably mounted, by means well known in the art, through weaver rings for example, to a locking weaver interface 33 which is engaged to the first weaver interface 28 and is placed in parallel relation with the run 26 of the handle 20 as is the first weaver interface 28.

FIG. 3 discloses that the first weaver interface 28 includes a base portion 32 formed to mate with the recess of the handle 20. The first weaver interface 28 is in parallel relation with the longitudinal axis of the firearm 9. A support portion 34 is connected to the base portion 32 and extends in spaced, parallel relation to the longitudinal axis of the firearm 9. The support portion 34 is generally rectangular in cross section having two long side edges. A first rail 36 extends upward from the support portion 34 adjacent one of the long side edges and a second rail 38 extends upward from the support portion 34 adjacent the other of the long side edges. The second rail 38 is in spaced parallel relation to the first rail 36. The upper surface 40 of the first rail 36 lies on the same horizontal plane as the upper surface 40a of the second rail 38. A series of notches 42, 42a are formed transversally through the first and second rails 36, 38 as shown in FIG. 3. The notches 42, 42a provide means of engaging other components. The notches 42, 42a are of varying widths. Each of the two long side edges of the support portion 34 are integral with an angled engagement surface 35 which extends the full length of the first and second rails 36, 38, lying below the plane of the first and second rails 36, 38 and are directed downwardly and away from the plane of the upper surfaces 40, 40a of the first and second rails 36, 38. The hole formed through the run 26 of the handle 20 and the through aperture 44 of the base portion 32 of the interface 28 are positioned in axial alignment. A headed screw 46 is positioned in coaxial relation to the aperture 44 with its threaded shank in coaxial relation to the aperture 44 and extending below the lower surface of base portion 32. The screw 46 is held in engagement with the interface 28 by passing a pin 48 through holes formed on the base portion 32 and on the groove formed on the head of the screw 46 as shown in FIG. 3. When the base portion 34 is positioned in the recess of the handle 20, the through hole is in coaxial alignment with the aperture 44 and the shank of the screw 46 extends below the lower surface of the handle 20, as shown in FIG. 2. A lock nut 50 is engaged to the threaded shank of the screw 46 completing the attachment of the interface 28 to the handle 20.

The locking weaver interface 33 includes a support portion 34a which is bar like in configuration and has a top surface 52. The support portion 34a has two long side edges. A first rail 36a extends upward from the support portion 34a adjacent one of the long side edges and a second rail 38a extends upward from the support portion 34a adjacent the other of the long side edges. A first engagement portion 58 extends from a portion of one of the long side edges of the support portion 34a in close proximity to one end thereof and beyond the area defined by the support portion 34a and lies on a horizontal plane below the bottom surface of the portion 52. A second engagement portion 60 extends from a portion of the same long side edge as that from which the first engagement portion 58 extends in close proximity to the other end thereof and beyond the area defined by the support portion 34a and lies on a horizontal plane below the bottom surface of the portion 52. Both the first engagement portion 58 and the second engagement portion 60 include a inturned angular grip portion 62.

A first fastening device 64 extends from a portion of the other long side edge of the support portion 34a in close proximity to one end thereof and in opposed relation to the first engagement portion 58. A second fastening device 66 extends from a portion of the same long side edge as that from which the first fastening device 64 extends, in close proximity to the other end thereof and in opposed relation to the second engagement portion 60.

The first fastening device 64 comprises a first locking means 68, first actuating means 70 and, as used in the embodiment disclosed herein, a support 71. The locking means 68 includes a first base portion 72 and a shaft 74. The base portion 72 has an upper surface 73 with the shaft 74 centrally positioned on and extending from the upper surface 73 in right angle relation thereto. A ring 76 extends from the upper surface 73 in circumscribing, abutting relationship to the shaft 74. The shaft 74 includes a free terminal end and an opening 78 transversely formed through the shaft in close proximity to the terminal end. The first base portion 72 is defined by first and second edges 72a, 72b which are in spaced parallel relation to each other and connected at one end by a first arced portion 75 and at the other end by a second arced portion 77. The upper surface of the first arced portion 75 of the first base portion 72 includes a first camming area 79 and the upper surface of the second arced portion of the first base portion 72 includes a second camming area 81. The first and second camming areas 79, 81 each have at least two portions beginning with the one nearest the first edge 72a of increasing sharpness of slope, for a purpose to be setforth hereinafter.

The first actuating means 70 includes a base 80 having a top surface, a bottom surface and a centrally positioned aperture 82 formed therethrough. A tubular portion 84 extends from the top surface in coaxial relation to the aperture 82 and in right angle relation to the top surface. A hole 86 is formed transversely through the tubular portion in right angle relation thereto. The tubular portion 84 includes an external surface from which an actuating handle 88 extends in right angle relation to the vertical axis of the tubular portion 84.

The support 71 is integral with the long side edge, includes an uppermost surface, a lowermost surface and has a first aperture 90 formed therethrough and in right angle relation thereto. The first aperture 90 includes an annular, internal shoulder 92.

To associate the locking means 68 with the support 71, the shaft 74 of the locking means 68 is passed through the first aperture 90 of the support 71 positioning the ring 76 of the locking means 68 within the first aperture 90 and the upper surface of the first base portion 72 in abutting relation to the lowermost surface of the support 71. A series of stacked springlike belleville washers 94 are mounted within the tubular portion in circumscribing relation to the shaft 74 with the lowest of the belleville washers 94 abutting the shoulder 92 and the ring 76. The free terminal end of the shaft 74 of the locking means 68 with the opening 78 is placed above the uppermost surface of the support 71. Association of the subassembly of the locking means 68 and the support 71 with the first actuating means 70, is accomplished by passing the shaft 74 of the locking means 68 through the aperture 82 and then through the tubular portion 84, in a press fit, horizontally aligning the opening 78 of the shaft 74 and the hole 86 of the tubular portion 84. This engagement extends the actuating handle 88 of the first actuating means 70 away from the support portion 34a and across the plane of the second edge 72b of the first base portion 72. A pin 94 is then passed through the hole 86 of the tubular portion 84 and the aligned opening 78 of the shaft 74. The components and method of assembly of the second fastening device 66 is identical with that of the first fastening device 64 as setforth hereinbefore.

Engagement of the locking weaver interface 33 with the first weaver interface 28 is accomplished by positioning the inturned angular grip portion 62 under and in abutting relation with the engagement surface 35 of the second rail 38. The first edge 72a of the first base portion 72 and the equivalent of the first edge 72a of the second fastening device 66 are positioned in close proximity to the engagement surface 35 of the first rail 36. Rotation of the lever of the first fastening device 64 in a counterclockwise direction and of the lever of the second fastening device 64 in a clockwise direction causes their respective first or second camming areas to pass, in abutting relation, under the engagement surface 35 of the first rail 36. Continuing the rotation increases the tightness of the engagement and the compression of the beleville washers or springs 94 provide the means of self adjusting from one Weaver rail to a different one. The engagement and disengagement of the weaver interface 33 with the first weaver interface 28 can thus be accomplished quickly and under military combat conditions.

What I claim is:

1. A fastening device comprising a locking means and an actuating means, the locking means including a base portion and a shaft, the base portion having an upper surface and the shaft centrally positioned on the upper surface in right angle relation thereto, a ring extends from the upper surface in circumscribing, abutting relationship to the shaft, the shaft including a free terminal end and an opening being transversely formed through the shaft in close proximity to the terminal end, the upper surface of the locking means including a first camming area and a second camming area spaced from the first camming area, the actuating means including a base having a top surface, a bottom surface and a centrally positioned aperture formed therethrough, a tubular portion extending from the top surface in coaxial relation to the aperture and in right angle relation to the top surface, a hole is formed transversely through the tubular portion in right angle relation thereto, the tubular portion includes an external surface from which a handle extends, the fastening device adapted to engage a support wherein the support having a platform means extending therefrom, the platform means including a support base having a first aperture formed therethrough, the first aperture including an internal shoulder, the support base including an uppermost surface and a lowermost surface and the shaft of the locking means passed through the first aperture of the support positioning the ring of the locking means within the first aperture and the upper surface of the base portion in abutting relation to the lowermost surface of the support, the shaft of the locking means being positioned in the tubular portion of the actuating means with the actuating means engaged to the locking means.

2. A fastening device comprising a locking means and an actuating means, the locking means including a base portion and a shaft, the base portion having an upper surface and the shaft positioned on the upper surface in right angle relation thereto, the shaft including a free terminal end, the upper surface of the base portion including a first camming area and a second camming area spaced from the first camming area, the actuating means including a base having a top surface and a centrally positioned aperture formed therethrough, a tubular portion extending from the top surface in coaxial relation to the aperture and in right angle relation to the top surface, the fastening device adapted to engage a support wherein the support having a platform means extending therefrom, the platform means including a support base having a first aperture formed therethrough, the first aperture including an internal shoulder, the support base including an uppermost surface and a lowermost surface and the shaft of the locking means passed through the first aperture of the support positioning a portion of the shaft of the locking means within the first aperture and the upper surface of the base portion in abutting relation to the lowermost surface of the support, the shaft of the locking means being positioned in the tubular portion of the actuating means with the actuating means engaged to the locking means and the tubular portion butted against the support.

3. A fastening device as set forth in claim 2 wherein the device is spring loaded.

4. The combination of a fastening device and a support, the fastening device comprising a locking means and an actuating means, the locking means including a base portion and a shaft, the base portion having an upper surface and the shaft positioned on the upper surface in right angle relation thereto, the shaft including a free terminal end, the upper surface of the base portion including a first camming area and a second camming area spaced from the first camming area, the actuating means including a base having a top surface and a centrally positioned aperture formed therethrough, a tubular portion extending from the top surface in coaxial relation to the aperture and in right angle relation to the top surface, the support having a platform means extending therefrom, the platform means including a support base having a first aperture formed therethrough, the first aperture including an internal shoulder, the support base including an uppermost surface and a lowermost surface and the shaft of the locking means passed through the first aperture of the support base positioning a portion of the shaft of the locking means within the first aperture and the upper surface of the base portion in abutting relation to the lowermost surface of the support, the shaft of the locking means being positioned in the tubular portion of the actuating means with the actuating means engaged to the locking means and the tubular portion butted against the support.

5. The combination as set forth in claim 4 wherein a ring extends from the upper surface in circumscribing, abutting relationship to the shaft, the shaft of the locking means passed through the first aperture of the support positioning the ring of the locking means within the first aperture, an opening being transversely formed through the shaft, a hole being formed transversely through the tubular portion in right angle relation thereto whereby the opening and the hole are aligned.

6. A combination as set forth in claim 5 wherein the device is spring loaded, the spring circumscribing the shaft and bearing against the base.

7. A combination as set forth in claim 6 wherein the spring is a belleville washer.

* * * * *